(12) United States Patent
Kamiyama et al.

(10) Patent No.: US 9,431,000 B2
(45) Date of Patent: Aug. 30, 2016

(54) VEHICLE WHEEL

(71) Applicant: HONDA MOTOR CO., LTD., Minato-Ku, Tokyo (JP)

(72) Inventors: Youichi Kamiyama, Wako (JP); Katsushi Ishii, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 97 days.

(21) Appl. No.: 14/277,995

(22) Filed: May 15, 2014

(65) Prior Publication Data

US 2014/0346842 A1    Nov. 27, 2014

(30) Foreign Application Priority Data

May 21, 2013  (JP) .................................. 2013-106931
Sep. 20, 2013  (JP) .................................. 2013-194877

(51) Int. Cl.
*B60C 19/00* (2006.01)
*G10K 11/172* (2006.01)
*B60B 21/12* (2006.01)

(52) U.S. Cl.
CPC ............. *G10K 11/172* (2013.01); *B60B 21/12* (2013.01); *B60B 2900/133* (2013.01)

(58) Field of Classification Search
CPC ............. B60B 2900/133; B60B 21/12; B60B 21/023; B60B 21/102; B60C 19/002; G10K 11/172
USPC ........................................................ 301/6.91
See application file for complete search history.

(56) References Cited

U.S. PATENT DOCUMENTS 4,896,921 A * 1/1990 Sato ........................ B60B 21/12
                                                    152/153
6,390,563 B1 * 5/2002 Haverkamp .......... B60C 19/002
                                                    152/381.5
(Continued)

FOREIGN PATENT DOCUMENTS

CN         1750943      3/2006
JP      2008-143286 A   6/2008
(Continued)

OTHER PUBLICATIONS

Office action corresponding to Japanese Patent Application 2013-194877 dated Aug. 4, 2015.
(Continued)

*Primary Examiner* — John Walters
*Assistant Examiner* — Brian Swenson
(74) *Attorney, Agent, or Firm* — Carrier Blackman & Associates, P.C.; Joseph P. Carrier; Jeffrey T. Gedeon

(57) ABSTRACT

A vehicle wheel includes an additional air chamber member on an outer circumferential surface of a well functioning as a Helmholtz resonator in a tire air chamber. The additional air chamber includes a body including an additional air chamber and a communication through hole for communication between the additional air chamber with a tire air chamber, and a fastening part for fastening the body between the first vertical wall surface and the second vertical wall surface. An upper surface of the body inclines to have an upward slope from a side of the first vertical wall surface to a side of the second vertical wall surface. The upper surface of the body is formed to extend along and inside or outside in a wheel diametrical direction a line connecting from the top of the vertical wall to the top of the hump on the side of the second vertical wall.

15 Claims, 12 Drawing Sheets

(56) References Cited

U.S. PATENT DOCUMENTS

| | | | |
|---|---|---|---|
| 7,475,713 B2 | 1/2009 | Naito et al. | |
| 7,690,410 B2 | 4/2010 | Kamiyama et al. | |
| 7,896,043 B2 * | 3/2011 | Kashiwai | B60C 23/0408 152/381.6 |
| 7,896,044 B2 * | 3/2011 | Kashiwai | B60B 3/04 152/381.6 |
| 8,181,685 B2 * | 5/2012 | Kamiyama | B60B 1/08 152/381.5 |
| 8,490,665 B2 * | 7/2013 | Nagata | B60B 1/06 152/381.6 |
| 2010/0096909 A1 | 4/2010 | Kamiyama et al. | |

FOREIGN PATENT DOCUMENTS

| | | | |
|---|---|---|---|
| JP | 2008279873 A | 11/2008 |
| JP | 2009051304 A | 3/2009 |
| JP | 2010095147 A | 4/2010 |
| JP | 2012-051397 A | 3/2012 |

OTHER PUBLICATIONS

Office Action dated Jan. 20, 2015 corresponding to Japanese Patent Application 2013-106931.

Office Action dated Nov. 2, 2015 with English translation of the corresponding Chinese Patent Application 201410208406.9.

Office Action issued in the corresponding Japanese Patent Application 2013-194877 dated Apr. 24, 2016.

* cited by examiner

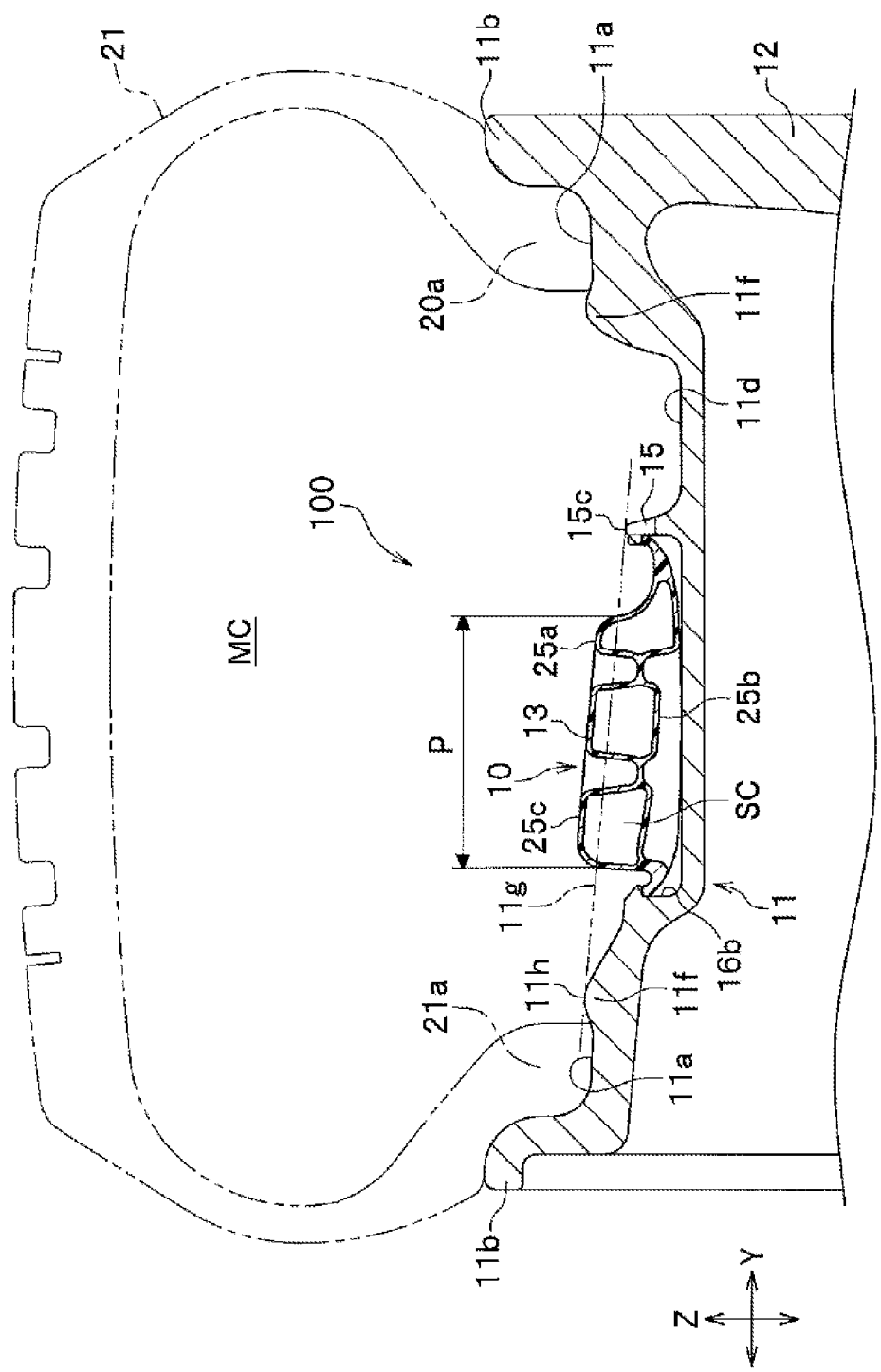

VEHICLE WHEEL

CROSS REFERENCE TO RELATED APPLICATION

This application claims the foreign priority benefit under Title 35, United States Code, §119(a)-(d) of Japanese Patent Application No. 2013-106931, filed on May 21, 2013 in the Japan Patent Office and Japanese Patent Application No. 2013-194877, filed on Sep. 20, 2013 in the Japan Patent Office, the disclosures of which are herein incorporated by reference in its entirety.

BACKGROUND OF THE INVENTION

1. Field of the Invention

The present invention relates to a vehicle wheel.

2. Description of the Related Art

As a prior art disclosing a vehicle wheel for reducing road noises caused by air column resonance in the tire air chamber is known in which the additional air chamber members functioning as a Helmholtz resonator are fixed on an outer circumferential surface of the well (for example, JP2012-51397A, FIGS. 2, 3, 9, etc. discloses).

The wheel is provided with a first vertical wall surface formed to extend in a circumferential direction of the outer circumferential surface and a second vertical wall surface facing the first vertical wall surface in a width direction of the outer circumferential surface.

The additional air chamber member is fitted into the space between the first vertical wall surface and the second vertical wall surface. Further, the additional air chamber member includes a body including the additional air chamber and a communication through hole for communication between the additional air chamber and the tire air chamber. At both ends in the width direction of the body, a fastening part is provided for fastening on the first and second vertical wall surfaces.

Such the additional air chamber member is formed to have cross sections in a width direction which are symmetry.

A wheel diameter and a wheel width depend on a size and usage of the vehicle. Accordingly, if it is assumed that a conventional wheel (for example, JP2012-51397) is attached to a vehicle having a small wheel diameter or a small wheel width, this results in a reduction in volume of the additional air chamber in accordance with the reduction in the wheel diameter and the wheel width.

However, when the volume of the additional air chamber decreases, this reduces a noise reduction effect against the air column resonance noise in the tire air chamber, so that there is a problem in that the road noise caused by the air column resonance noise in the tire air chamber cannot be sufficiently reduced.

SUMMARY OF THE INVENTION

Accordingly, the present invention provides a vehicle wheel including an additional air chamber member sufficiently secure the volume of the additional air chamber even if the wheel diameter and the wheel width are reduced.

A first aspect of the present invention provides a vehicle wheel including an additional air chamber member on an outer circumferential surface of a well functioning as a Helmholtz resonator in a tire air chamber, comprising: a first vertical wall surface formed on a vertical wall which stands up on an outer circumferential surface of the well to extend in a circumferential direction of the outer circumferential surface, a second vertical wall surface formed on one rising part of the well to extend in a circumferential direction of the outer circumferential surface so as to face the first vertical wall surface in the width direction of the outer circumferential surface. A part between the vertical wall and the another rising part of the well is used for drop a tire bead thereon while the tire is being attached to the vehicle wheel. The additional air chamber member comprises a body, fitted into the first vertical wall surface and a second vertical wall, including an additional air chamber and a communication through hole for communication between the additional air chamber with a tire air chamber, and a fastening part, formed on the both sides of the body configured to fasten the body between the first vertical wall surface and the second vertical wall surface. In the cross section of the body in the width direction, an upper surface of the body inclines to have an upward slope from a side of the first vertical wall surface to a side of the second vertical wall surface.

According to such a vehicle wheel, a necessary quantity of the volume of the additional air chamber can be surely provided. The vehicle wheel can more surely reduce the road noise.

In the first aspect, a top of the vertical wall is lower than a top of a hump on the side of the second vertical wall from the outer circumferential surface. The upper surface of the body is formed to extend along and inside in a wheel diametrical direction a line connecting from the top of the vertical wall to the top of the hump on the side of the second vertical wall.

The vehicle wheel can expand the additional air chamber outwardly in the wheel diameter direction to a maximum extent within such a range that the additional air chamber member does not impede a tire attaching process while the tire is being attached and such a range that the additional air chamber member is not damaged by the tire attaching process.

In the cross section of the body in the width direction, the body may protrude upwardly from the line connecting from the top of the vertical wall to the top of the hump on the side of the second vertical wall.

The vehicle wheel can expands the additional air chamber outwardly in the wheel diameter direction to a maximum extent within such a range that the additional air chamber member does not impede a tire attaching process while the tire is being attached and such a range that the additional air chamber member is not damaged by the tire attaching process.

In the vehicle wheel, the additional air chamber member comprises a pair of additional air chamber members that are arranged to face each other across a rotation center of the wheel.

According to the vehicle wheel a wheel unbalance (static balance) caused in one of the additional air chamber member can be cancelled out by another additional air chamber member, so that it becomes unnecessary to install a counter weight at a counter position of the additional air chamber member. Accordingly the weight of the wheel can be further reduced. Accordingly, the present invention provides a vehicle wheel including an additional air chamber member sufficiently secure the volume of the additional air chamber even if the wheel diameter and the wheel are decreased.

BRIEF DESCRIPTION OF THE DRAWINGS

The object and features of the present invention will become more readily apparent from the following detailed description taken in conjunction with the accompanying drawings in which:

FIG. 7 is a partial cross section view of the vehicle wheel according to the first embodiment to show a positional relation between a hump and the vertical wall;

FIRST EMBODIMENT

The vehicle wheel according to a first embodiment of the present invention includes additional air chamber members (Helmholtz resonators) for reducing road noise caused by air column resonance in the tire air chamber on an outer circumferential surface of the well.

Further, the vehicle wheel according to the present invention features that an upper surface of a body of the additional air chamber member inclines to have an upward slope from the first vertical wall surface side to the second vertical wall surface side as described in detail later.

Hereinafter, the additional air chamber member is described in detail and then, a whole structure of the vehicle wheel is described.

Figure 1:
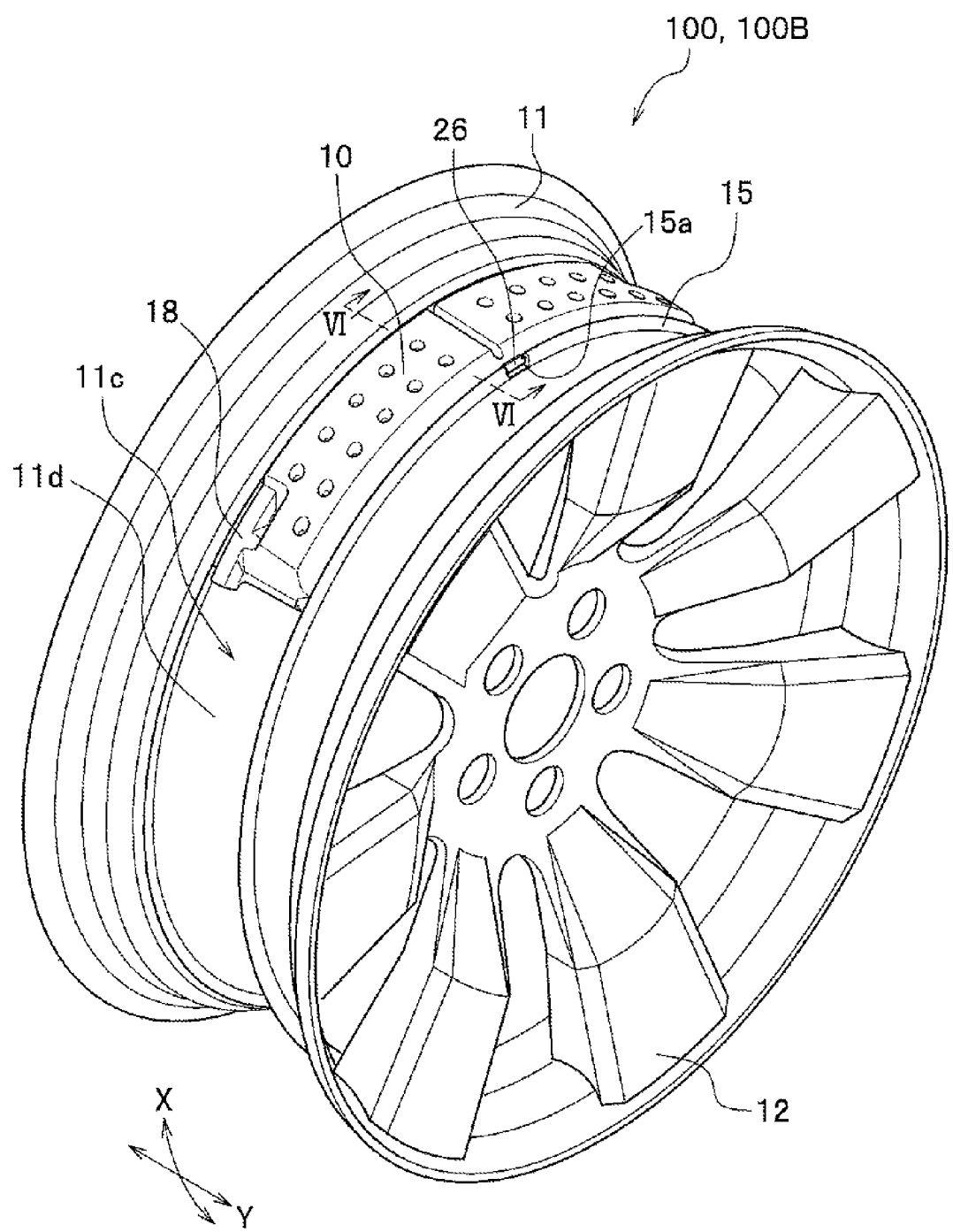
FIG. 1 is a perspective view of a vehicle wheel according to first and second embodiments of the present invention.

FIG. 1 is a perspective view of the vehicle wheel 100 according to the first and second embodiments of the present invention.

The vehicle wheel 100 includes, as shown in FIG. 1, a disk 12 for connecting the rim 11 to a hub (not shown).

The rim 11 includes a well 11c hollowed inward in a wheel radial direction (on a side of the rotation center) between bead seats of the tire formed on both sides in the wheel width direction Y shown in FIG. 1.

The well 11c is provided to drop beads of the tire thereinto when the beads of the tire (not shown) is installed in the rim 11. Regarding this, the well 11c in the embodiment is formed in a hollow cylindrical shape having approximately the same diameter in the wheel width direction Y.

In FIG. 1, Reference "11d" denotes an outer circumferential surface of the well 11c. Reference "18" denotes a tube for forming a communication through hole 20 (see FIG. 2) described later. Reference "15" denotes a vertical wall having a ring shape installed on an outer circumferential surface 11d of the well 11c to extend in a circumferential direction of the rim 11. Regarding this, the additional air chamber member 10 is attached and fastened to a vertical wall 15 as described latter. Reference "15a" denotes a notch in the vertical wall 15 through which a protruding part 26 is fitted when the additional air chamber member 10 is attached to the vertical wall 15.

In FIG. 1, Reference "X" indicates an arrow indicating the wheel circumferential direction.

Next, the additional air chamber member 10 will be described below.

Figure 2:
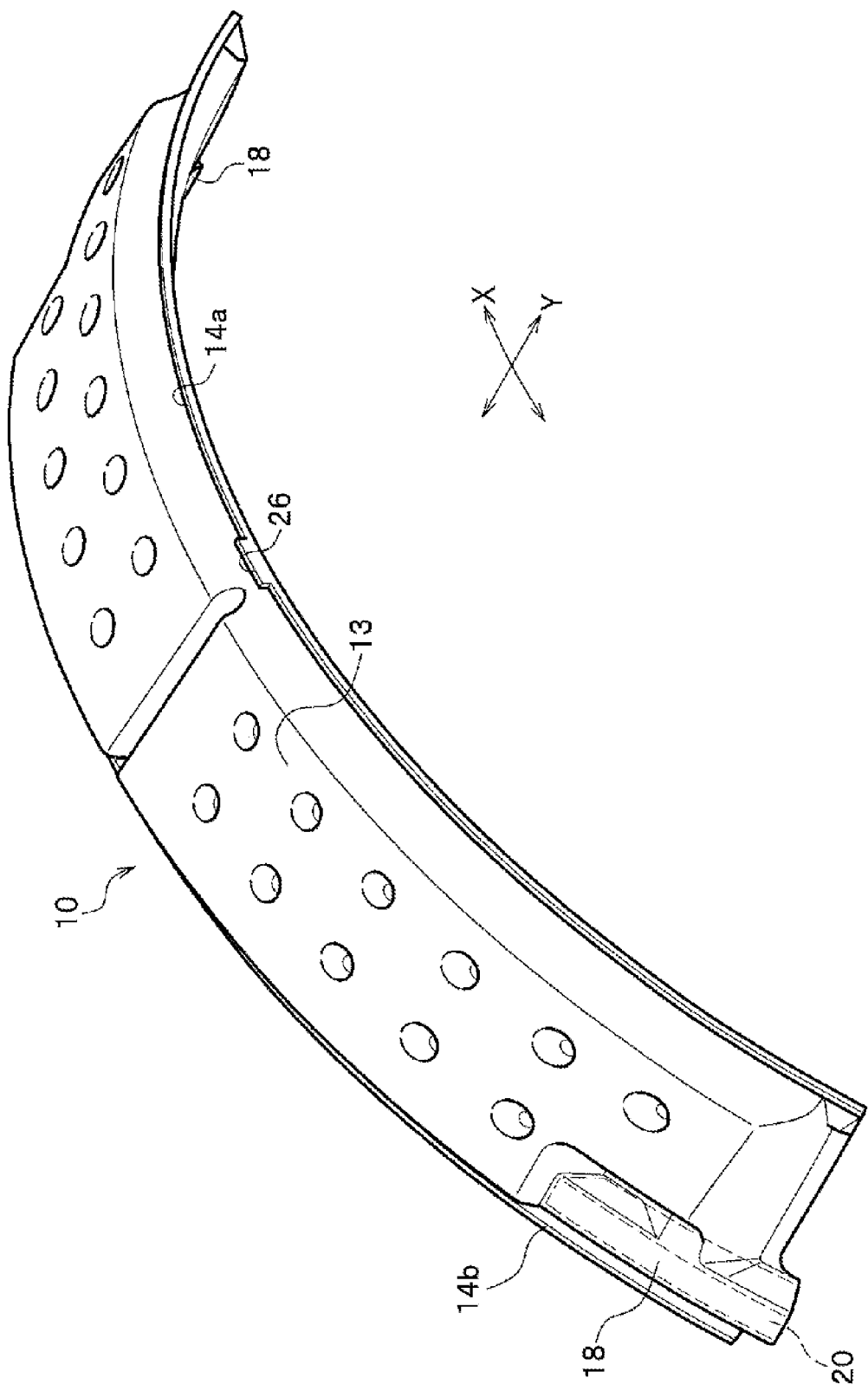
FIG. 2 is a general perspective view of additional air chamber members.

FIG. 2 is a perspective view showing the whole of the additional air chamber 10 according to the first embodiment.

The additional air chamber member 10 is, as shown in FIG. 2, a long member extending in one direction and includes the body 13, being hollowed, having the additional air chamber SC thereinside (see FIG. 4) and rim parts 14a, 14b for fastening (holding) the body 13 to the first and second vertical wall surfaces 16a, 16b (see FIG. 6) mentioned later.

The rim parts 14a, 14b corresponds to a fastening member.

The additional air chamber member 10 curves in the longitudinal direction thereof to extend on the outer circumferential surface 11d (see FIG. 1) of the well 11c (see FIG. 1) in the wheel circumferential direction X when being attached to the outer circumferential surface 11d (see FIG. 1). Reference "18" denotes a tube forming a part of the body 13 to form the communication through hole 20 communicating with the additional air chamber SC (see FIG. 4) thereinside. Reference "26" is a protruding part provided on the rim part 14a, and Reference "Y" denotes a wheel width direction Y.

FIG. 3A is a plan view of the additional air chamber member 10 viewed from a protruding side in FIG. 2, and FIG. 3B is a plan view of the additional air chamber member 10 viewed from a hollow side in FIG. 2.

The additional air chamber member 10 has, as shown in FIG. 3A, a long rectangular shape in plan view. A shape of the body 13 in addition to a formation region of the tube 18 in the plan view is a rectangular which is smaller than the first additional air chamber member 10a by one size class.

The body 13 in which the additional air chamber SC (see FIG. 4) thereinside, i.e., the body 13 excepting the tube 18 and a connecting part 35 has substantially a hat shape (a middle part is protruding) in a plan view shown in FIG. 3A.

A part of the body 13 where the additional air chamber SC (see FIG. 4) is formed includes a crown part and the brim of the hat shape. In other words, the part of the body 13 is mainly configured with a full width part 13a extending in the wheel circumferential direction X with a maximum width (corresponding to the crown part) and an extending part 13b (corresponding to the brim), extending from the full width part 13a in the wheel circumferential direction X and in parallel to the tube 18 in the wheel width direction Y.

As shown in FIG. 3A, provided on an upper side of the body 13 (a protruding side of the additional air chamber 10), is a groove D1 at a middle in the longitudinal direction thereof across the body 13 in a width direction (the wheel width direction Y). The groove D1 is, as described later, formed with the upper plate 25a (see FIG. 4) of the body 13 being hollowed toward the bottom plate 25b (see FIG. 4).

Figure 3:
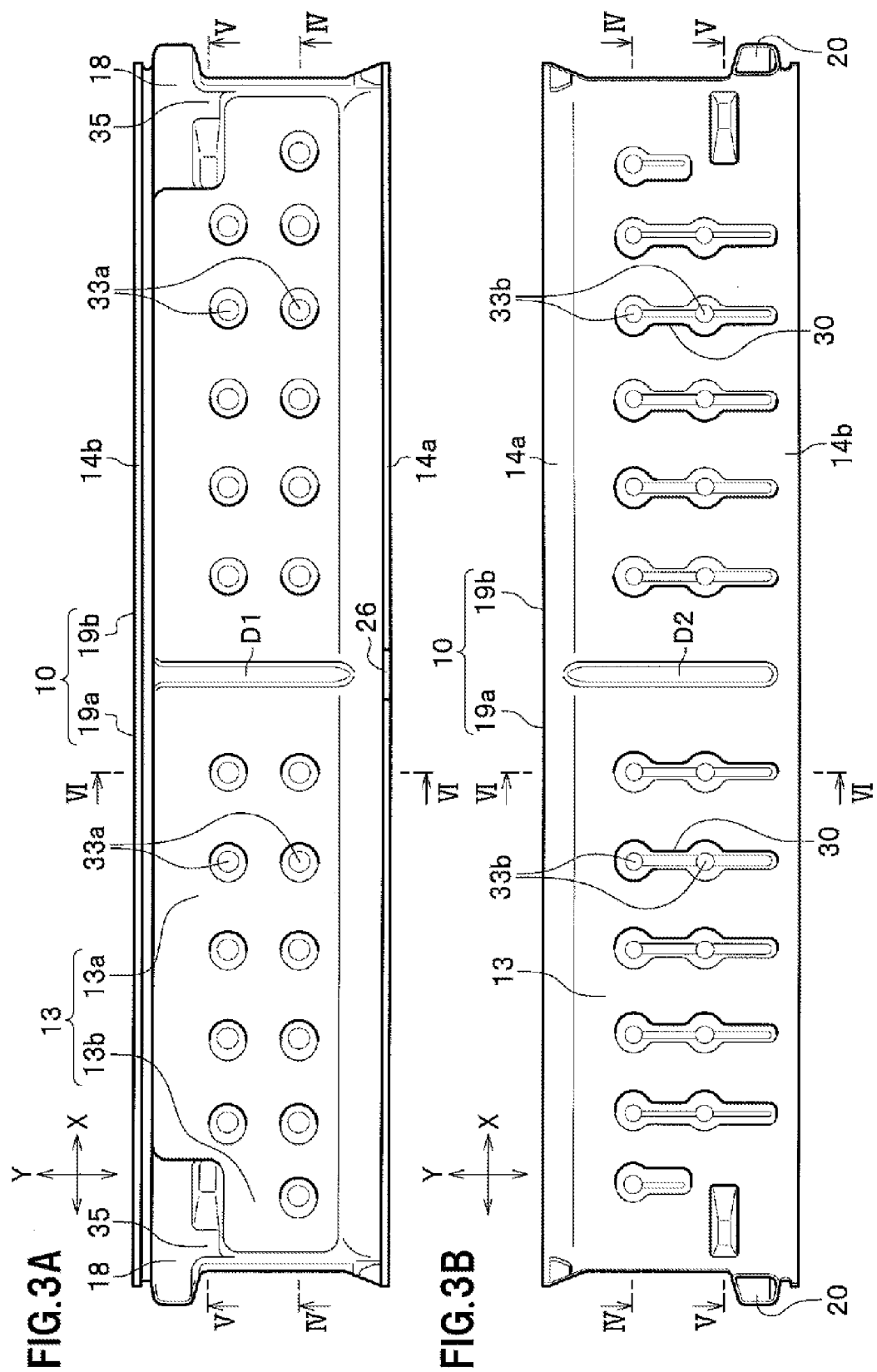
FIG. 3A is an upper view of the additional air chamber viewed from a protruding side.
FIG. 3B is a bottom view of the additional air chamber viewed from a hollow side.
Figure 4:
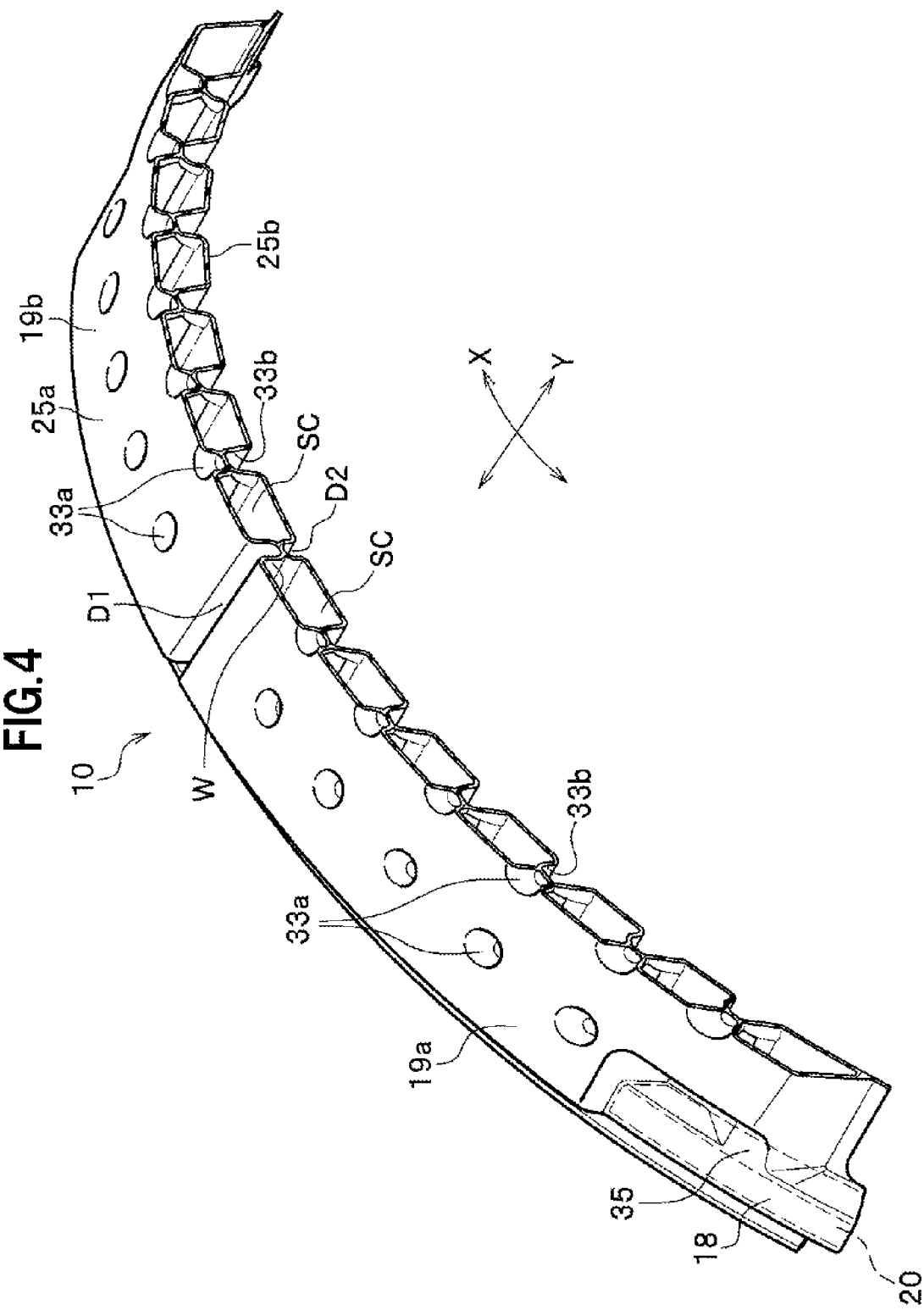
FIG. 4 is a perspective view of the additional air chamber members, cut away along line IV-IV in FIG. 3A.

As shown in FIG. 3B, the groove D2 extends, at a middle in the longitudinal direction of the body 13 on the lower surface side (hollowed side of the additional air chamber member 10), in the width direction (the wheel width direction Y) at a middle in the longitudinal direction The groove D2 is formed with the bottom plate 25b (see FIG. 4) of the body 13 being hollowed toward the upper plate 25a (see FIG. 4).

The grooves D1 and D2 configure to provide the partitioning wall W described later (see FIG. 4) by partially connecting the upper plate 25a and the bottom plate 25b to form the hollowed part. Partitioning the hollowed part of the body 13 into two provides a pair of the additional air chambers SC (see FIG. 4).

As shown in FIG. 3A, a pair of the tubes 18 are disposed at both ends in the longitudinal direction (the X direction) of the additional air chamber member 10 and arranged with offset to one side edge in a shorter direction of the additional air chamber member 10 (the wheel width direction Y). More specifically, the tube 18 in the first embodiment, is disposed near the rim part 14b out of the two rim parts 14a, 14b.

The tubes 18 extend in the longitudinal direction of the additional air chamber member 10 (wheel circumferential direction). Each of the communication through hole 20 formed in one pair of the tubes 18 (see FIG. 3B) provides individual communication between the additional air chamber SC (see FIG. 4) and the external. More specifically, the additional air chamber member 10 has a configuration of two Helmholtz resonators 19a, 19b connected integrally with each other across the groove D1 and the groove D2.

The rim parts 14a, 14b each extend from the body 13 in the shorter direction of the additional air chamber member 10 (the wheel width direction Y). The rim parts 14a, 14b are fastening the additional air chamber member 10 to the well 11c (see FIG. 1). The rim parts 14a, 14b will be described in detail later.

Reference "26" in FIG. 3A denotes a protruding part described in detail later. Reference "33a" denotes an upper side connecting part. Reference "30" in FIG. 3B denotes beads and Reference "33b" denotes a lower side connecting part. These upper side connecting part 33a, the bead 30, and the lower side connecting part 33b are described with reference to FIGS. 4 and 5.

Figure 5:
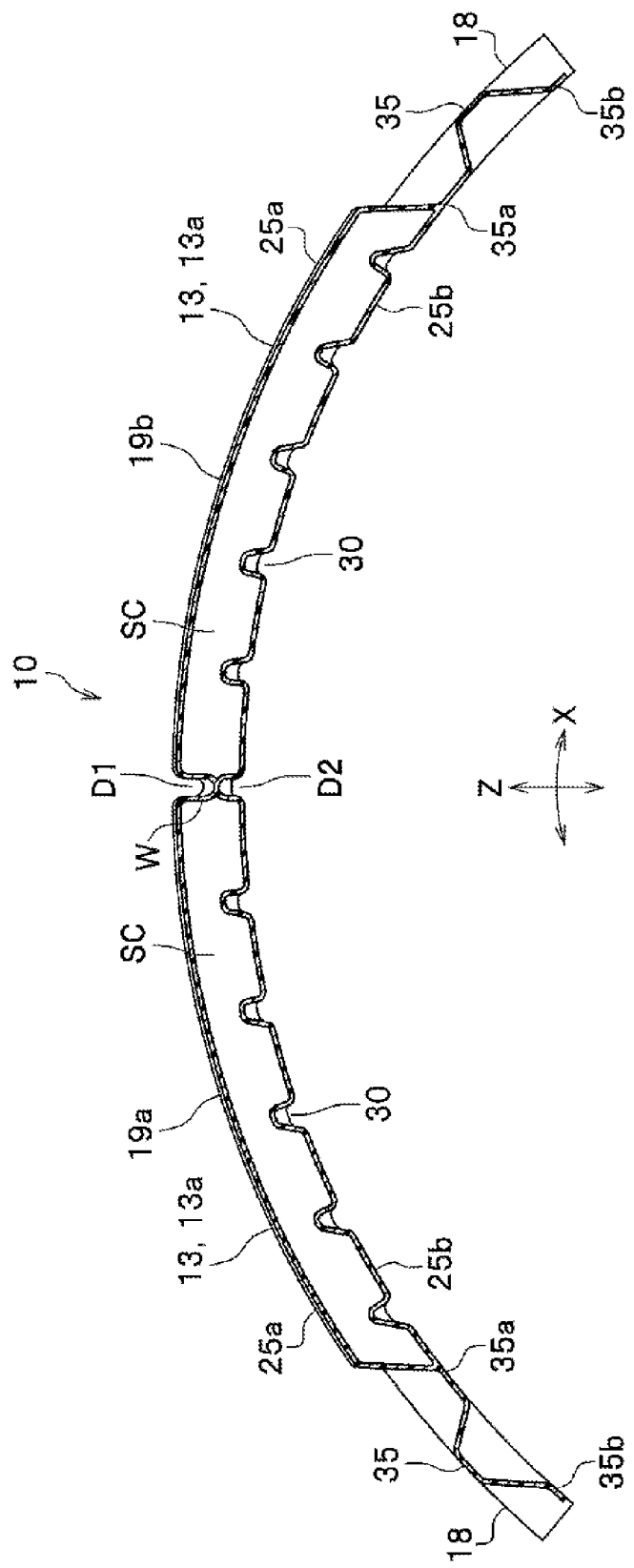
FIG. 5 is a cross section view, taken along V-V in FIGS. 3A and 3B.

FIG. 4 is a perspective view indicating the additional air chamber member 10 cut away long line IV-IV. FIG. 5 shows a V-V cross section view shown in FIG. 3.

As shown in FIGS. 4 and 5, the body 13 of the additional air chamber member 10 includes the bottom plate 25b and the upper plate 25a for forming the additional air chamber SC between the bottom plate 25b and the upper plate 25a. The resin materials forming the upper plate 25a and the bottom plate 25b have the same thicknesses. However, these thickness may be different each other.

The upper plate 25a forms the additional air chamber SC with the upper plate 25a which is curved to have a protrusion above the bottom plate 25b disposed along an outer circumferential surface 11d of the well 11c.

The communication through hole 20 of the tube 18 extending in the wheel circumferential direction X communicates with the additional air chamber SC at one end side in the wheel circumferential direction X and communicates with the external at the other end side.

A volume of the SC is preferably set to a value from 50 cc to 250 cc. Setting the volume of the additional air chamber SC to the region allows the first Helmholtz resonators 19a, 19b to perform the noise reduction effect sufficiently without increase in weight to provide the weight saving of the vehicle wheel 100. In addition, a length of the additional air chamber member 10 in the wheel circumferential direction X (see FIG. 2) can be appropriately set to a half of the circumferential length (a circumferential length of the outer circumferential surface 11d of the well 11c) at the maximum in consideration of easiness of trimming the weight of the vehicle wheel 100 and assembling to the well 11c.

The communication through hole 20 communicates the additional air chamber SC with the tire air chamber MC to be formed between a tire (not shown) and the well 11c (see FIG. 1).

A cross sectional shape of the communication through hole 20 is not specifically limited, but may be any one of an oval, a circle, a polygon, a D-shape, etc. When the cross section is converted into a circle, a diameter of the communication through hole 20 is preferably equal to or greater than 5 mm.

The length of the communication through hole 20 is set to satisfy an equation for determining a resonance frequency of the Helmholtz resonator as shown in Eq. (1).

$$f0 = C/2\pi \times \sqrt{(S/V(L+\alpha \times \sqrt{S}))} \quad (1)$$

where f0 (Hz): resonance frequency;

C (m/s): a sound velocity in the additional air chamber (=sound velocity in the tire air chamber MC);

V ($m^3$): a volume of the additional air chamber SC;

L (m): a length of the communication through hole 30;

S ($m^2$): a cross sectional area of an opening of the communication through hole 20; and α: a correction coefficient.

Further, the resonance frequency f0 is equalized to a resonance frequency of the tire air chamber MC.

As shown in FIG. 4, the upper plate 25a includes an upper connecting part 33a formed at a part forming the body 13. The upper connecting part 33a is formed so that the upper plate 25a is hollowed toward the bottom plate 25b and shows a circle shape in plan view. The upper connecting parts 33a are formed in two lines arranged in the width direction of the body 13 along a longitudinal direction of the additional air chamber member 10 (the wheel circumferential direction X) as shown in FIG. 2. More specifically, as shown in FIG. 3A, at the full width part 13a, the upper connecting parts 33a are formed in two lines thereof, i.e., twenty of the upper connecting part 33a are formed. At the extending parts 13b, there are two upper connecting parts 33a, respectively.

As shown in FIG. 3, the bottom plate 25b includes bottom side connecting parts 33b formed at a position corresponding to the upper connecting parts 33a.

These bottom side connecting parts 33b are formed so that the bottom plate 25b is hollowed toward the upper plate 25a and shows a circle in plan view. These bottom side connecting parts 33b connect the upper plate 25a and the bottom plate 25b such that a tip of the bottom side connecting part 33b is connected to a tip of the upper connecting part 33a integrally.

The upper connecting part 33a and the bottom side connecting part 33b connected with each other in the additional air chamber SC increases a mechanical strength of the additional air chamber member 10 and suppresses variation in the volume of the additional air chamber SC to provide the noise reduction function.

In addition, the present invention can provide a configuration not including the upper connecting part 33a and the bottom side connecting part 33b.

As shown in FIGS. 4 and 5, in the additional air chamber member 10, a hollowed part of the body 13 is sectioned by the partitioning wall W into two additional air chambers SC.

The additional air chamber member 10 has a configuration including two Helmholtz resonators 19a, 19b formed across the partitioning wall W.

The partitioning wall W is formed by connection of the groove D1 formed on a side of the upper plate 25a and the groove D2 formed on a side of the bottom plate 25b. The partitioning wall W according to the first embodiment forms a pair of the additional air chambers SC by partitioning a hollow part of the body 13.

The partitioning wall W according to the present invention is provided to form the two additional air chambers SC by partitioning the hollow space of the body 13. In addition, there may be a configuration in which the upper plate 25a and the bottom plate 25b are connected by the presence of only the groove D2 without forming the groove D1.

Next, the connecting parts 35 formed between the extending part 13b of the body 13 and the tube 18 will be described below.

The connecting portion 35 is, as shown in FIGS. 4 and 5, formed by partially connecting the upper plate 25a to the bottom plate 25b integrally between the extending part 13b and the tube 18.

More specifically, the connecting part 35 forms, as shown in FIG. 5, the base end 35a with the upper plate 25a and the bottom plate 25b connected at an end in the wheel circumferential direction X of the full width part 13a of the body 13.

The connecting part 35 includes a bending plate forming a bending part extended from the base end 35a outwardly in a wheel diametrical direction Z on the way where the connecting part 35 extends in the wheel circumferential direction X from the base end 35a. In the first embodiment, the base end 35a and the 3a tip end 5b of the connecting part 35 are formed at the same height as the bottom plate 25b extending (on the same curved plane in the wheel circumferential direction X). The bead 30 (see FIG. 3B) is, as shown in FIG. 5, formed with the bottom plate 25b being partially hollowed to the side of the upper plate 25a.

The bead 30 in the first embodiment extends in the width direction (the wheel width direction Y) of the additional air chamber member 10 at a formation location of the bottom side connecting part 33b. In other words, the bead 30 increases the bottom plate 25b (see FIG. 5) in a surface stiffness by connection with the bottom side connecting part 33b.

Next, installation of the additional air chamber member 10 on the well 11c (see FIG. 1) will be described below.

Figure 6:
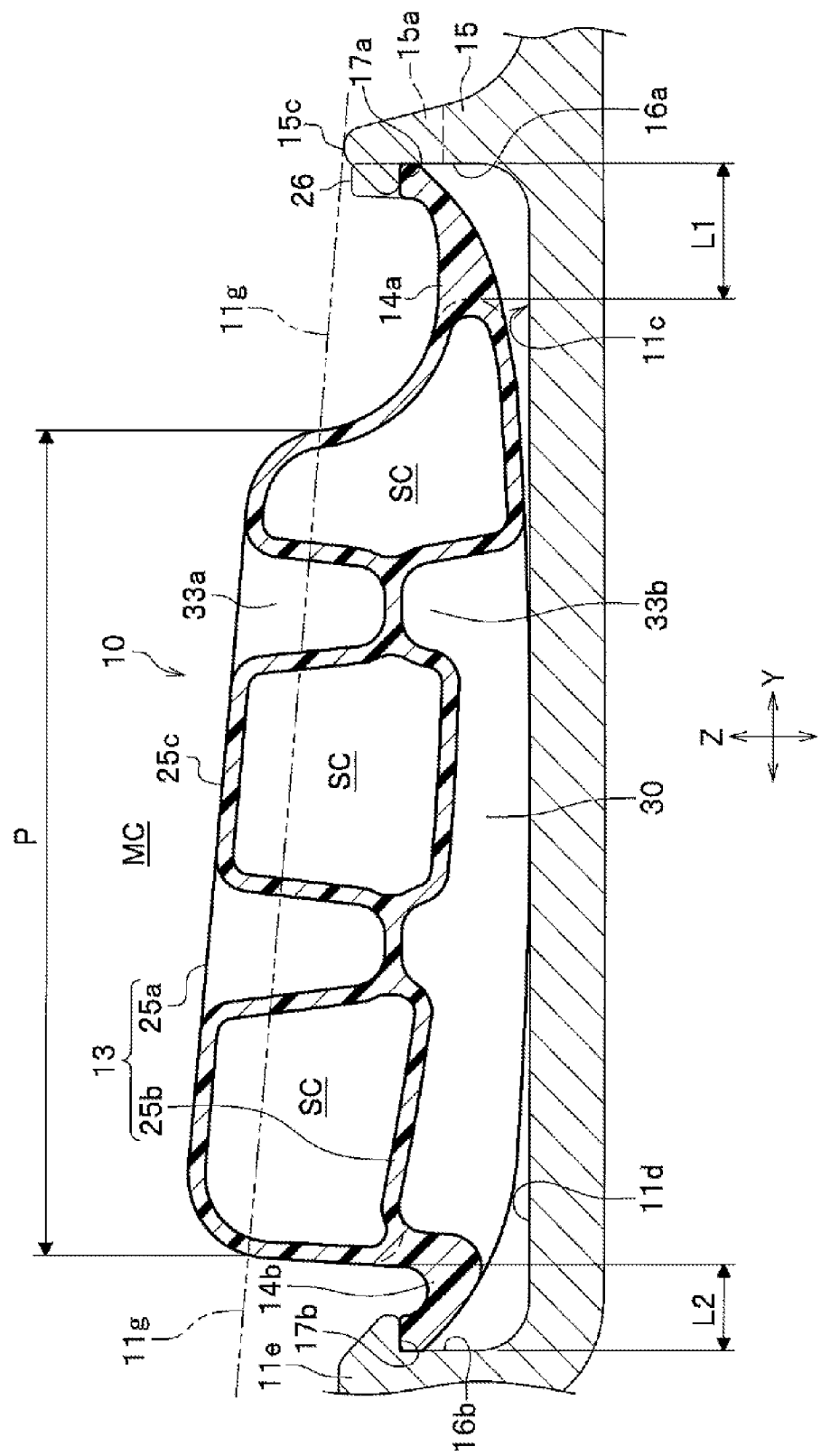
FIG. 6 is a cross section view, taken along VI-VI in FIG. 1 and corresponding to VI-VI cross section in FIGS. 3A and 3B.

FIG. 6 is a cross section view, taken along VI-VI in FIG. 1 and corresponding to VI-VI cross section in FIG. 3.

As described in FIG. 6, the rim part 14a and the rim part 14b are, as shown in FIG. 6, formed to extend in the wheel width direction Y from the body 13 formed with the upper plate 25a and the bottom plate 25b. The rim part 14a extends toward the first vertical wall surface 16a from the body 13 and the tip end is fitted into the groove 17a of the first vertical wall surface 16a. Further, the rim part 14b extends from the body 13 to the second vertical wall surface 16b and a tip thereof is fitted into the groove 17b in the second vertical wall surface 16b.

The first vertical wall surface 16a is defined by a side surface of the vertical wall 15 inside in the wheel width direction Y (the left side in FIG. 6). The second vertical wall surface 16b is defined by the (rising part) side part 11e of the well 11c facing the first vertical wall surface 16a. The grooves 17a, 17b form annular circumferential grooves formed along a circumferential direction of the outer circumferential surface 11d of the well 11c. The vertical wall 15 and the side part 11e in the first embodiment are shaped together with the well 11c, when the rim 11 is casted (see FIG. 1). The grooves 17a, 17b are formed by mechanical process applied to the vertical wall 15 and the side part 11e.

In the first embodiment, out of the rim part 14a and the rim part 14b the rim part 14b as one side has a length L2 which is shorter then a length L1 of the rim part 14a as the other side. The length L1 of the rim part 14a is equal to a distance from an outer end on a side of the vertical wall 16a side of the body 13 to a bottom of the groove 17a and to a distance from the outer end of the body 13 to the first vertical wall surface 16a in the first embodiment. The length L2 of the rim part 14b is equal to a distance from an outer end of the body 13 on a side of the second vertical wall surface 16b to a bottom of the groove 17b and to a distance from the outer end of the body 13 to the second vertical wall surface 16b in the first embodiment.

These the rim parts 14a and 14b, extending to the first vertical wall surface 16a and to the second vertical wall surface 16b, respectively form a curved surface protruding to the outer circumferential surface 11d of the well 11c together with the bottom plate 25b which is curved. For the rim parts 14a, 14b, a thicknesses or a material are appropriately selected to provide appropriate spring-constants therein.

In FIG. 6, Reference "SC" denotes the additional air chamber, and Reference "MC" denotes the tire air chamber formed between the tire (not shown) and the well 11c. Reference "26" denotes a protruding part fitted into the notch 15a in the vertical wall 15. A reference "11g" denotes a line 11g connecting a top 11h of the hump 11f (see FIG. 7) on a side of the second vertical wall surface 16b to a top 15c of the vertical wall 15. A positional relation between the line 11g and the body 13 will be described in detail later.

Next, a positional relation will be described below between the additional air chamber member 10, the hump 11f (see FIG. 7), and the vertical wall 15 when the additional air chamber member 10 is displaced on the well 11c. FIG. 7 is a partial cross section view according to the first embodiment shows a positional relation between the additional air chamber member attached to the well and the hump and the vertical wall.

As shown in FIG. 7, the rim 11 includes the bead seats 11a, 11a, the rim flange 11b, 11b bent in letters L, and the well 11c hollowed inwardly in the wheel diameter direction between the bead seats 11a, 11a.

The well 11c is, as described earlier, provided to drop the bead 21a, 20a when the tire 21 is attached to the rim 11.

The bead sheet parts 11a, 11a includes the humps 11f, 11f having outwardly protruding outwardly in the wheel diametrical direction, respectively.

In FIG. 7, Reference "MC" denotes the tire air chamber.

In the vehicle wheel 100 according to the first embodiment, a height of the top 11h of the hump 11f on the side of the second vertical wall surface 16b from the outer circumferential surface 11d of the well 11c is set to be higher than the height of the top 15c of the vertical wall 15 from the outer circumferential surface 11d of the well 11c.

Accordingly, in the cross section of the body 13 in the wheel width direction Y, the line 11g extending from the top 15c of the vertical wall 15 to the top 11h of the hump 11f on the side of the second vertical wall surface 16b inclines to the outer circumferential surface 11d of the rim 11 to have an upward slope relative to the outer circumferential surface 11d of the rim 11.

Further, in the cross section of the body 13 in the wheel width direction Y, the upper surface of the body 13 of the additional air chamber member 10 is formed along the line 11g.

In other words, as shown in FIG. 6, in the cross section of the body 13 in the wheel width direction Y, the upper surface of the body 13 has the flat part 25c which is flat in the wheel width direction Y. The flat part 25c is in parallel to the line 11g.

Accordingly, the flat part 25c forming the upper surface of the body 13 inclines from the side of the first vertical wall surface 16a to the second vertical wall surface 16b relative to the outer circumferential surface 11d of the rim 11 to have the upward slope.

In addition, the vehicle wheel 100 according to the first embodiment (see FIG. 7), in the cross section of the body 13 in the wheel width direction Y, the body 13 partially protrudes upwardly from the line 11g. In other words, the line 11g extends in the wheel width direction Y inside in the wheel diametrical direction Z relative to the flat part 25c forming the upper surface of the body 13.

Reference "P" in FIGS. 6 and 7, denotes a part of the upper plate 25a forming a main part of the additional air chamber SC. The part P corresponds to the part of the body partially protruding.

Figure 8A:
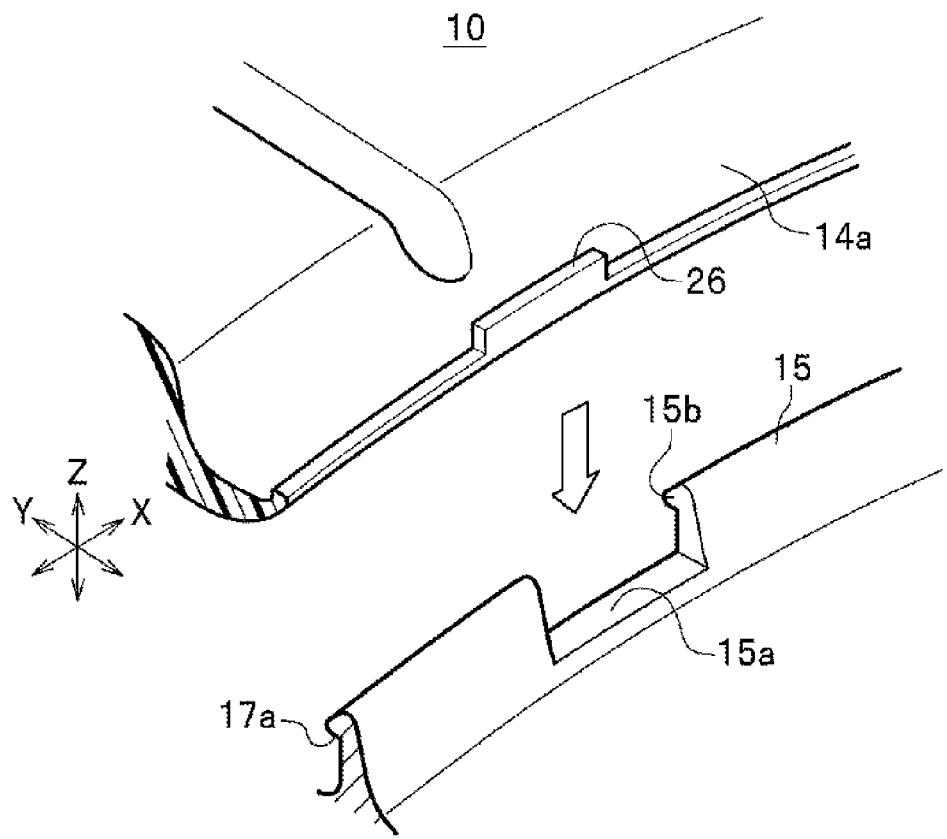
FIG. 8A is a partially enlarged perspective view showing the vicinity of a protruding part of the additional air chamber member and a notch being formed in the vertical wall on the well.
Figure 8B:
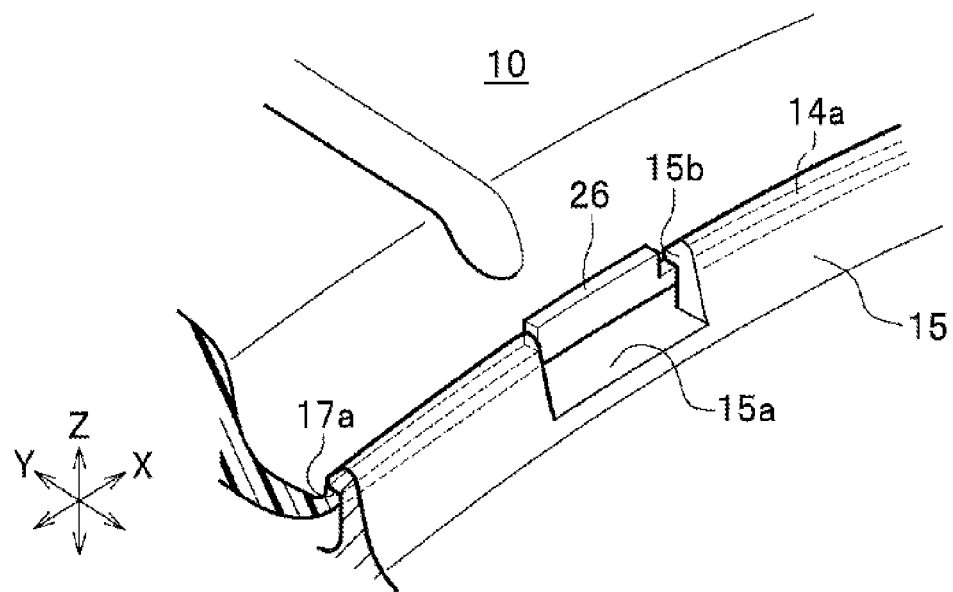
FIG. 8B is a partial enlarged view of the protruding part fitted to the notched part.

FIG. 8A is a partially enlarged perspective view showing the protruding part 26 of the additional air chamber member 10 and the vicinity of a notch 15a formed in the vertical wall 15 of the well 11c, and positions of the through holes. FIG. 8B is a partially enlarged perspective view showing the protruding part 26 fitted into the notch 15a.

As shown in FIG. 8A, the protruding part 26 is a piece formed to protrude outwardly in the wheel diametrical direction Z (upwardly of an arrow Z) at a tip of the rim part 14a of the additional air chamber member 10. The protruding part 26 is formed to have such a width in the wheel circumferential direction X to be fitted into the notch 15a.

A protruding height of the protruding part 26 is, as shown in FIG. 8B, set to such a height that the protruding part 26 can abut an inside upper part 15b when a tip of the rim part 14a is fitted into the groove 17a of the vertical wall 15.

According to the configuration, the protruding part 26 functions as a rotation stopper in the wheel circumferential direction X of the additional air chamber member 10 by fitting into the notch 15a when the protruding part 26 is fasten to the vertical wall 15 through the rim part 14a.

The additional air chamber member 10 according to the first embodiment is assumed as a resin mold. When the additional air chamber member 10 according to the first embodiment is a resin molding, it is desirable that a resin capable of blow shaping in consideration of the weight reduction, mass producing performance, and reduction in manufacturing cost and hermetic sealing. Particularly, polypropylene, having a resistance to cyclic ending fatigue, is preferable.

Figure 9A:
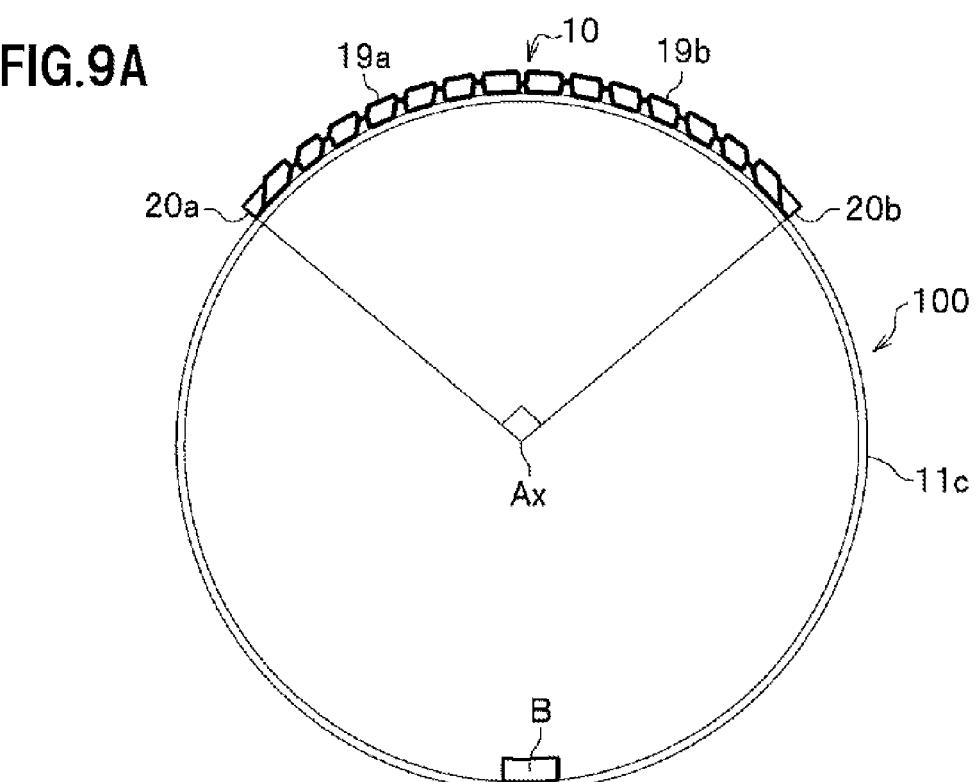
FIG. 9A is a schematic diagram showing the additional air chamber members are arranged on a well in the first embodiment.
Figure 9B:
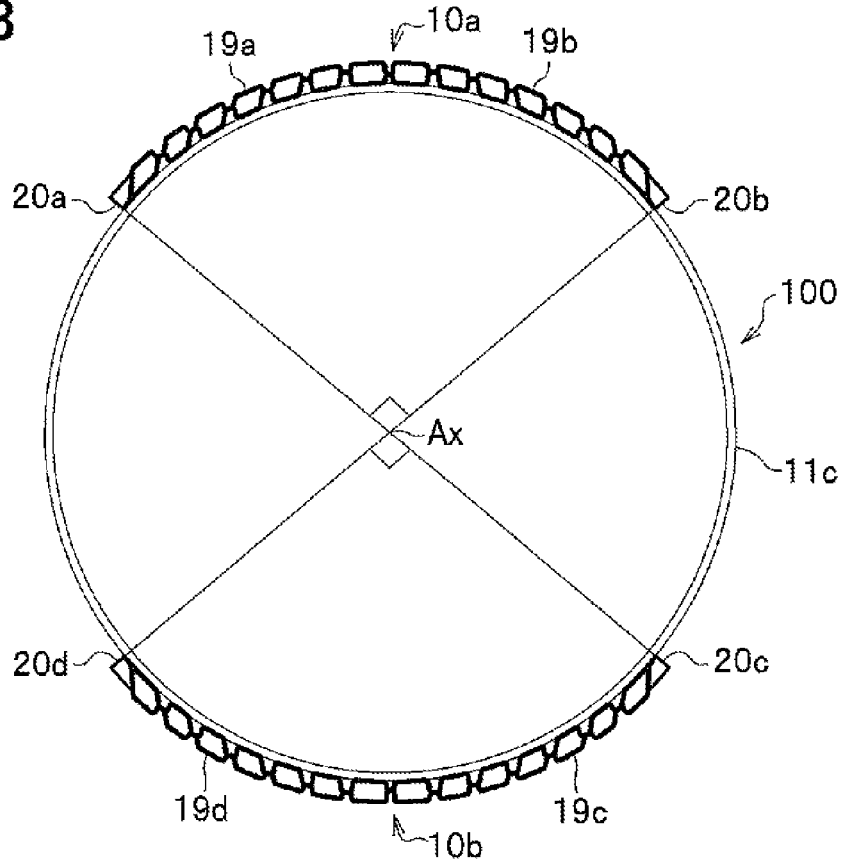
FIG. 9B shows the additional air chamber members arranged on the well according to a modification of the first embodiment.

Next a position of the additional air chamber member 10 in the vehicle wheel 100 according to the first embodiment of the vehicle wheel 100. FIG. 9A is a schematic drawing illustrating that the additional air chamber member 10 is disposed on the well 11c in the vehicle wheel 100 according to the embodiment. FIG. 9B is a schematic drawing illustrating that the additional air chamber member 10 is disposed on the well 11c in the vehicle wheel 100 according to a modification of the first embodiment.

As shown in FIG. 9A, the vehicle wheel 100 according to the first embodiment has such a configuration that two Helmholtz resonators 19a, 19b are integrally formed with each other as described above. The communication through hole 20a of the first Helmholtz resonator 19a and the communication through hole 20b are spaced in the circumferential direction at an angle of 90 degree on a wheel rotation center Ax.

Reference "B" denotes a counter weight for cancelling out a wheel unbalance (static balance) caused by attaching the additional air chamber member 10 to the well 11c.

According to the vehicle wheel 100, because the communication through holes 20a, 20b are spaced in the circumferential direction at an angle of 90 degrees on the wheel rotation center axis Ax, which avoids an unevenness in noise reduction.

As shown in FIG. 9B, in the vehicle wheel 100 according to the modification of the first embodiment, the first additional air chamber member 10a and the second additional air chamber member 10b are attached to the well 11c so as to face across the wheel rotation center AX. The first additional air chamber member 10a and the second additional air chamber member 10b have the same configuration as the additional air chamber member 10.

According to the vehicle wheel 100, because the communication through holes 20a, 20b are spaced in the circumferential direction at an angle of 90 degree on the wheel rotation center axis Ax, which avoids an unevenness in noise reduction.

The vehicle wheel 100 according to the modification of the first embodiment, can avoid unevenness in noise reduction. Further, a wheel unbalance (static balance) caused in one of the additional air chamber member 10a can be cancelled by another additional air chamber member 10b, so that it becomes unnecessary to install a counter weight at a counter position of the additional air chamber member 10. Accordingly the weight of the wheel can be further reduced.

Figure 10A:
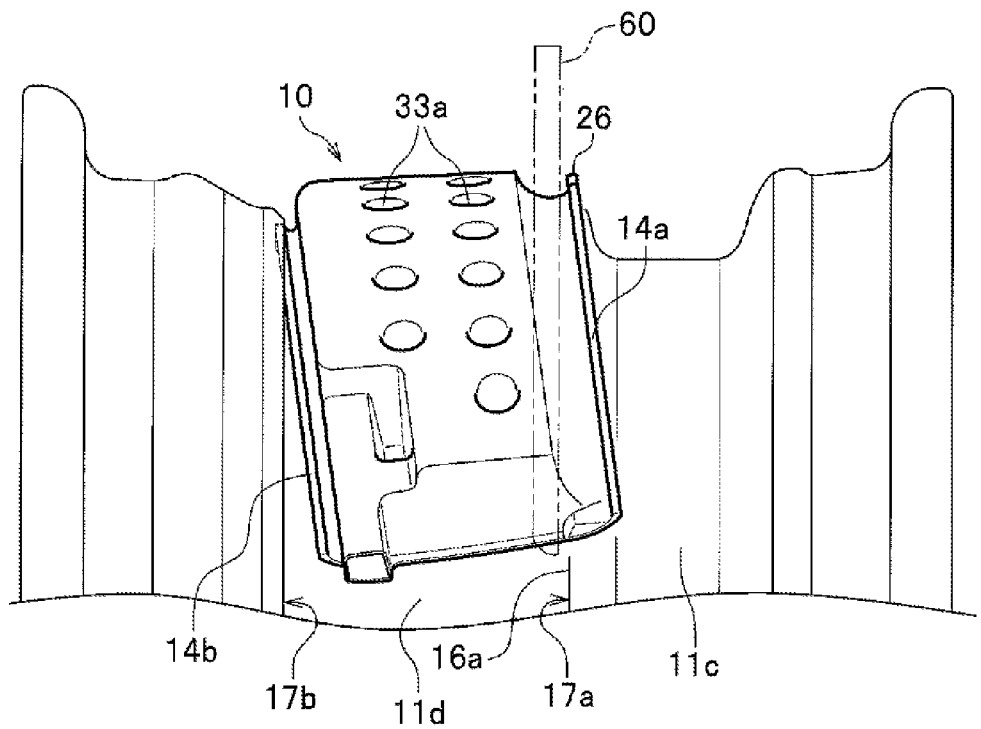
FIGS. 10A and 10B are drawing showing a process of mounting method of the additional air chamber member on the well of the rim.
Figure 10B:
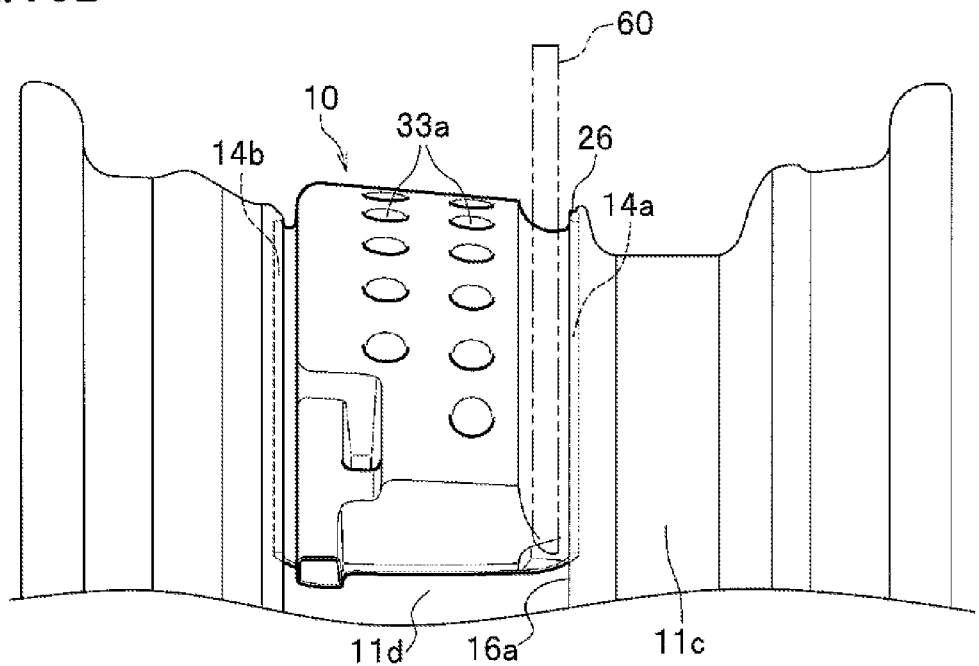
Figure 11:
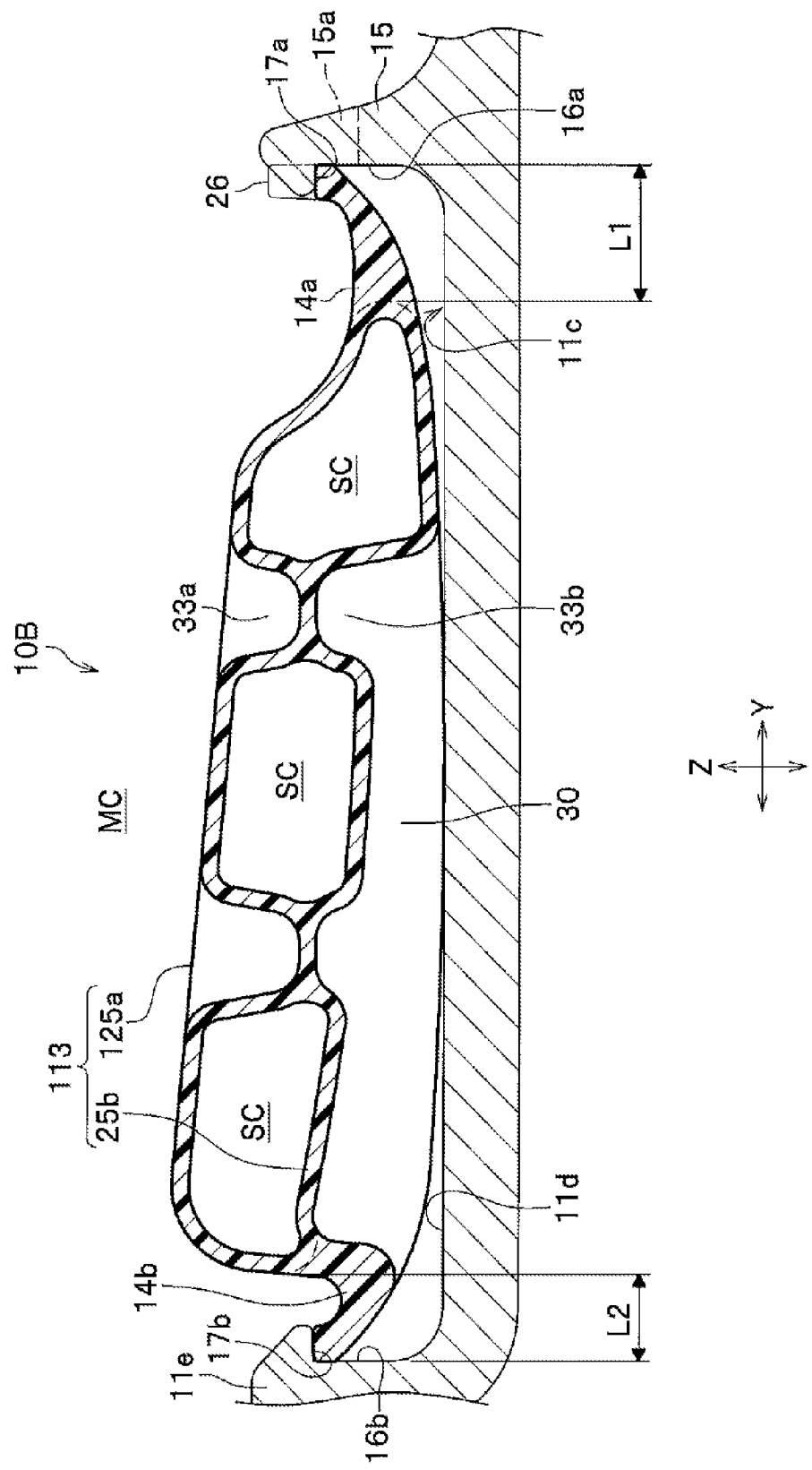
FIG. 11 is a cross section view of the vehicle wheel according to a second embodiment of the present invention, taken along VI-VI in FIG. 1 corresponding to VI-VI cross section in FIG. 3.

Next, a method of attaching the additional air chamber member 10 to the well 11c will be described below. FIGS. 10A and 10B show a process of attaching the additional air chamber member 10 to the well 11c.

To attach the additional air chamber member 10 to the well 11c in the first embodiment, it is assumed that a pusher (pressurizing device) 60 is used which pressurizes the rim part 14a at a location near the groove 17a toward the outer circumferential surface 11d of the well 11c as shown in FIGS. 10A and 10B.

As the pusher 60, for example, there is a device for pushing the rim part 14a (see FIGS. 10A and 10B) with an air pressure generated by an air cylinder.

In FIG. 10A, 10B, the pusher 60 is shown with an imaginary line (long dashed double-short dashed line) for convenience of preparing drawings.

As the pusher 60 used in the first embodiment, for example, a plate-like member including an edge part having an external line in an arc shape having a curvature corresponding to the curvature in the longitudinal direction of the additional air chamber member 10. The pusher 60 is not limited to this, but may be appropriately modified.

In this method of attaching the additional air chamber member 10, as shown in FIG. 10A, first the additional air chamber member 10 is inclined to partially fit the rim part 14b having a shorter dimension into the groove 17b.

In FIG. 10A, the pusher 60 denoted with the imaginary line is applied to the rim part 14a. Reference "11d" is an outer circumferential surface of the well 11c.

Next, as shown in FIG. 10B, the pusher 60 pushes the rim part 14a toward the outer circumferential surface 11d of the well 11c. Then, the rim part 14b of the additional air chamber member 10 gradually fitted into the groove 17b as the inclination angle relative to the outer circumferential surface 11d of the well 11c.

During this, the rim part 14a, which is long and has a certain spring constant is deformed in accordance with the pushing force of the pusher 60.

When the pusher 60 pushes the rim part 14a toward the outer circumferential surface 11d of the well 11c, as shown in FIG. 6, the rim part 14a is fitted into the groove 17a formed in the first vertical wall surface 16a. During this, the protruding part 26 is fitted into the notch 15a of the vertical wall 15 (see FIG. 8B). When the rim part 14a and the rim part 14b are perfectly fitted into the groove 17a and the groove 17b, the additional air chamber member 10 is installed on the well 11c.

Next, an advantageous effect of the vehicle wheel 100 will be described below.

Generally, a wheel size (width), varying depending on the size of the vehicle, is preferably set through adjusting a length from the rising wall surface of the well 11c (for example, the second vertical wall surface 16b) to the hump (for example, the hump 11f).

In the vehicle wheel 100 according to the first embodiment, the upper surface (the flat part 25c) of the body 13 inclines from the side of the first vertical wall surface 16a to the second vertical wall surface 16b relative to the outer circumferential surface 11d of the rim 11 to have an upward slope.

According to the vehicle wheel 100, the additional air chamber SC can be expanded to the outermost side in the wheel diametrical direction Z within such a range that the additional air chamber member 10 does not impede attaching process of the tire 21 or such a range that the additional air chamber member 10 is not hurt. According to the vehicle wheel 100, a necessary volume of the additional air chamber SC can be secured though the wheel diameter or a wheel width is decreased in accordance with a size or a usage of a vehicle. In other words, according to the vehicle wheel 100, the road noises can be reduced because of having a higher noise reduction effect against the air column resonance noise in the tire air chamber MC.

In the vehicle wheel, the body 13 partially protrudes from the line 11g connecting the top 15c of the vertical wall 15 to the top 11h of the hump 11f on a side of the second vertical wall surface 16b, the necessary volume of the additional air chamber SC can be surly provided. According to the vehicle wheel 100, the road noise can be surely reduced.

Accordingly, the vehicle wheel 100 can surly provide a necessary value of the additional air chamber SC when the wheel diameter or a wheel width is reduced. The vehicle wheel 100 can solve the problem in that the road noise is insufficiently reduced because the noise reduction effect against the air column resonance of the tire.

Further, the vehicle wheel 100 can secure a larger volume of the additional air chamber SC. This increases a degree of freedom in designing the communication through holes 20a, 20b to be separated by 90 degrees to avoid unevenness in noise reduction.

In the above-described embodiment, the additional air chamber member 10 is configured to have two Helmholtz resonators 19a, 19b formed integrally. However, the additional air chamber member according to the present invention may have one Helmholtz resonator.

In the embodiment described above, it is assumed that the flat part 25c of the body 13 is substantially in parallel to the line 18g. However, in the present invention, it is sufficient that the flat part 25c inclines from the side of the first vertical wall surface 16a to the second vertical wall surface 16b relative to the outer circumferential surface 11d of the rim 11 to have an upward slope. It is not necessary that the inclination angle accurately agrees with the angle between the line 11g and the outer circumferential surface 11d.

SECOND EMBODIMENT

A vehicle wheel 100B according to a second embodiment of the present invention is substantially the same as the vehicle wheel 100 according to the first embodiment and a vehicle wheel having additional air chamber (Helmholtz resonator) for reducing the road noise caused by the air column resonance in the tire air chamber on an outer circumferential surface of the well.

Accordingly, a configuration which is different from the vehicle wheel according to the first embodiment will be described mainly.

The vehicle wheel 100B according to the second embodiment is different mainly in that a height of the upper surface of the body 113 of the additional air chamber member 10B from the outer circumferential surface 11d is suppressed to be low.

Figure 12:
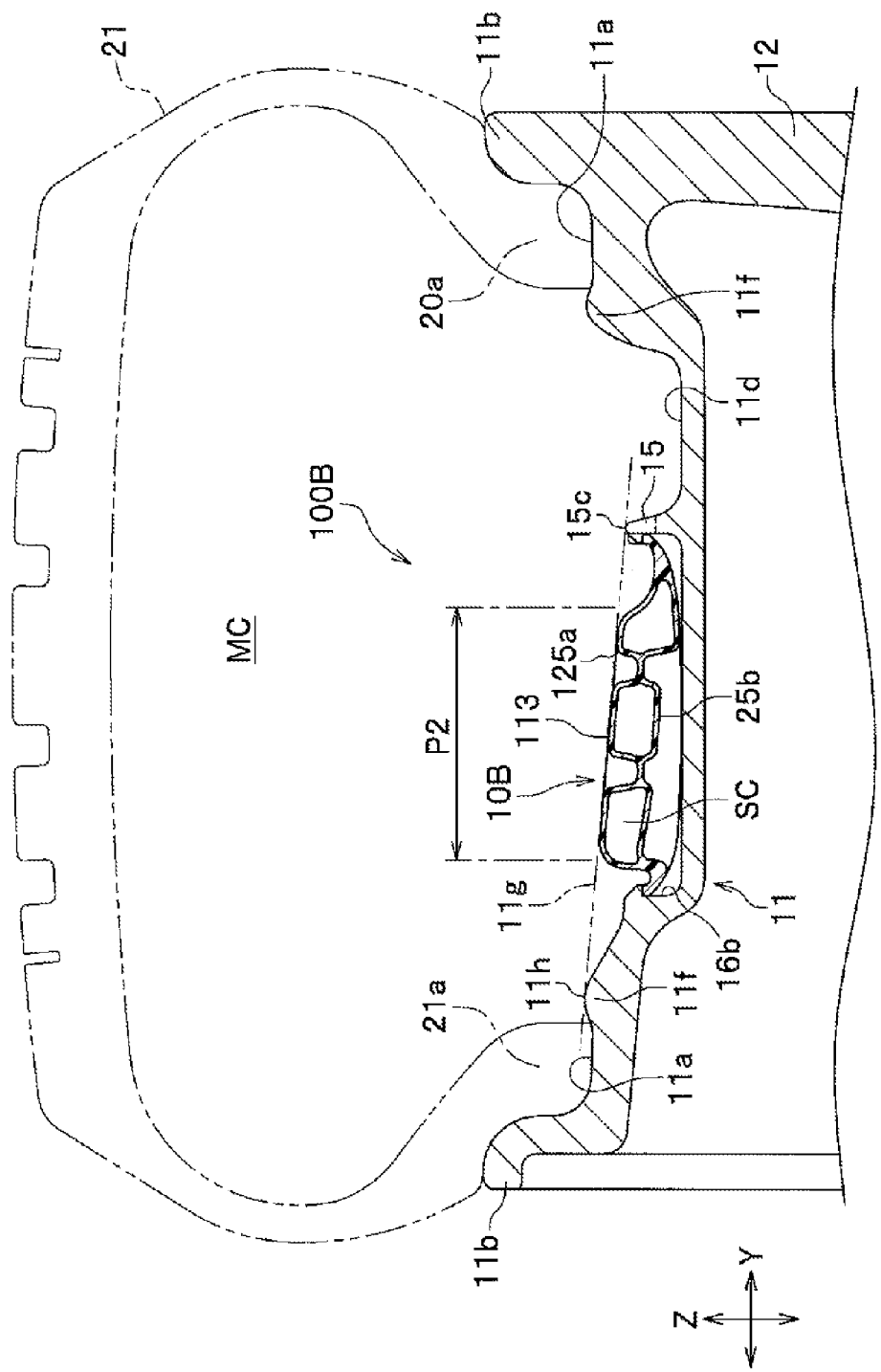
FIG. 12 is a partial cross section view of the vehicle wheel according to the second embodiment to show a positional relation among the additional air chamber member, a hump, and a vertical wall.

A positional relation among the additional air chamber member 10B, the hump 11f (see FIG. 12), and the vertical wall 15 will be described when the additional air chamber member 10B is disposed on the well 11c. FIG. 12 is a partial cross section view of the vehicle wheel according to the second embodiment.

As shown in FIG. 12, the rim 11 includes the bead seats 11a, 11a formed at both ends in the wheel width direction Y, the rim flanges 11b, 11b bent toward the outside in the wheel diametrical direction Z, and the well 11c hollowed inwardly in the wheel diametrical direction between the bead seats 11a, 11a.

The well 11c is provided, as described above, to drop the beads 21a, 21a of the tire 21 when the tire 21 is attached to the rim 11.

The bead seats 11a, 11a includes the humps 11f, 11f protrude outwardly in the wheel diametrical direction just before the bead seats 11a, 11 fall to the well 11c.

In FIG. 12, the reference "MC" denotes a tire air chamber MC.

In the vehicle wheel 100B according to the second embodiment, a height of the top 15c of the vertical wall 15 from the outer circumferential surface 11d of the well 11c is set to be lower than the height of the top 11h of the hump 11f on the side of the second vertical wall 16b from the outer circumferential surface 11d of the well 11c.

Further, in a cross section of the body 113 in the wheel width direction Y, the part P2 of the upper plate 125a for forming a main part of the additional air chamber SC is formed along and inside the line 11g in the wheel diametrical direction Z, the line connecting the top 15c of the vertical wall 15 to the top 11h of the hump 11f on the side of the second vertical wall surface 16b. Other configurations are the same as those of the vehicle wheel according to the first embodiment.

Next, an advantageous effect of the vehicle wheel 100B will be described below.

According to the vehicle wheel 100B, in a cross section of the body 113 in the wheel width direction Y, the part P2 of the upper plate 125a for forming a main part of the additional air chamber SC is formed along and inside the line 11g in the wheel diametrical direction Z, the line connecting the top 15c of the vertical wall 15 to the top 11h of the hump 11f on the side of the second vertical wall surface 16b. The part P2 of the upper plate 125a for forming a main part of the additional air chamber SC is arranged inside a passing line of the bead 21a of the tire 21 when the 21 is attached. The part P2 forming the main part of the additional air chamber SC is arranged along the line 11g, it is possible to expand the additional air chamber SC to a maximum extent in the wheel diametrical direction Z. Accordingly, the vehicle wheel 100B can secure the additional air chamber volume at maximum, because the additional air chamber SC is located without interference by the bead 21a of the tire 21 when the tire 21 is attacked.

This configuration provides a necessary quantity of the additional air chamber SC even if the wheel diameter and the wheel width are reduced. The vehicle wheel 100B can eliminate the problem in that the road noise cannot be sufficiently reduced because the volume of the additional air chamber SC decreases, resulting decrease in the noise reducing effect against the air column resonance.

Further, the vehicle wheel 100B can secure a larger volume of the additional air chamber SC. This increase a degree of freedom in designing the communication through holes 20a, 20b to be separated by 90 degrees to avoid unevenness in noise reduction.

In the above-described embodiment, the additional air chamber member 10B is configured to have two Helmholtz resonators 19a, 19b formed integrally. However, the additional air chamber member according to the present invention may have one Helmholtz resonator.

DESCRIPTION OF REFERENCE SYMBOL 10, 10B additional air chamber member
10a first additional air chamber member
10b second additional air chamber member
11c well
11d outer circumferential surface
11f hump
11g connecting line
13, 113 body
13a full width part
13b extending part
14a rim part (fastening part)
14b rim part (fastening part)
15 vertical wall
15a notch
16a first vertical wall surface
16b second vertical wall surface
17a groove
17b groove
18 tube
19a, 19b, 19c, 19d Helmholtz resonator
20, 20a, 20b, 20c, 20d communication through hole
21 tire
21a bead (tire bead)
25a, 125a upper plate
25b bottom plate
26 protruding part
35 connecting part
60 pusher
100, 100B vehicle wheel
MC tire air chamber
SC additional air chamber
X wheel circumferential direction
Y wheel width direction
W partitioning wall
Z wheel diametrical direction

The invention claimed is:

1. A vehicle wheel including an additional air chamber member on an outer circumferential surface of a well functioning as a Helmholtz resonator in a tire air chamber, comprising:
   a first vertical wall surface formed on a vertical wall which stands up on an outer circumferential surface of the well to extend in a circumferential direction of the outer circumferential surface,
   a second vertical wall surface formed on one rising part of the well to extend in a circumferential direction of the outer circumferential surface so as to face the first vertical wall surface in the width direction of the outer circumferential surface, wherein
   a part between the vertical wall and another rising part of the well is used for drop a tire bead thereon while the tire is being attached to the vehicle wheel; wherein
   the additional air chamber member comprising a body fitted into the first vertical wall surface and a second vertical wall, including an additional air chamber and a communication through hole for communication between the additional air chamber with a tire air chamber, and a fastening part, formed on the both sides of the body configured to fasten the body between the first vertical wall surface and the second vertical wall surface, wherein
   in the cross section of the body in the width direction, an upper surface of the body inclines to have an upward slope from a side of the first vertical wall surface to a side of the second vertical wall surface relative to the outer circumferential surface.

2. The vehicle wheel as claimed in claim 1, wherein a top of the vertical wall is lower than a top of a hump on the side of the second vertical wall from the outer circumferential surface, and wherein the upper surface of the body is formed to extend along and inside in a wheel diametrical direction a line connecting the top of the vertical wall to the top of the hump on the side of the second vertical wall.

3. The vehicle wheel as claimed in claim 2, wherein, in the cross section of the body in the width direction of the body, the body upwardly protrudes from a line connecting the top of the vertical wall to the top of the hump on the side of the second vertical wall.

4. The vehicle wheel as claimed in claim 3, wherein the additional air chamber member comprises a pair of additional air chamber members that are arranged to face each other across a rotation center of the wheel.

5. The vehicle wheel as claimed in claim 2, wherein the additional air chamber member comprises a pair of additional air chamber members that are arranged to face each other across a rotation center of the wheel.

6. The vehicle wheel as claimed in claim 1, wherein, in the cross section of the body in the width direction of the body, the body upwardly protrudes from a line connecting the top of the vertical wall to the top of the hump on the side of the second vertical wall.

7. The vehicle wheel as claimed in claim 6, wherein a top of the vertical wall is lower than a top of a hump on the side of the second vertical wall from the outer circumferential surface, and wherein the upper surface of the body is formed to extend along and inside in a wheel diametrical direction a line connecting the top of the vertical wall to the top of the hump on the side of the second vertical wall.

8. The vehicle wheel as claimed in claim 6, wherein the additional air chamber member comprises a pair of additional air chamber members that are arranged to face each other across a rotation center of the wheel.

9. The vehicle wheel as claimed in claim 1, wherein the additional air chamber member comprises a pair of additional air chamber members that are arranged to face each other across a rotation center of the wheel.

10. A vehicle wheel including an additional air chamber member on an outer circumferential surface of a well functioning as a Helmholtz resonator in a tire air chamber, comprising:
   a first vertical wall surface formed on a vertical wall which stands up on an outer circumferential surface of the well to extend in a circumferential direction of the outer circumferential surface,
   a second vertical wall surface formed on one rising part of the well to extend in a circumferential direction of the outer circumferential surface so as to face the first vertical wall surface in the width direction of the outer circumferential surface, wherein
   a part between the vertical wall and another rising part of the well is used for drop a tire bead thereon while the tire is being attached to the vehicle wheel; wherein
   the additional air chamber member comprising a body fitted into the first vertical wall surface and a second vertical wall, including an additional air chamber and a communication through hole for communication between the additional air chamber with a tire air chamber, and a fastening part, formed on the both sides of the body configured to fasten the body between the first vertical wall surface and the second vertical wall surface, wherein
   in the cross section of the body in the width direction, an upper surface of the body inclines to have an upward slope from a side of the first vertical wall surface to a side of the second vertical wall surface, and
   a top of the vertical wall is lower than a top of a hump on the side of the second vertical wall from the outer circumferential surface, and wherein the upper surface of the body is formed to extend along and inside in a wheel diametrical direction a line connecting the top of the vertical wall to the top of the hump on the side of the second vertical wall.

11. The vehicle wheel as claimed in claim 10, wherein, in the cross section of the body in the width direction of the body, the body upwardly protrudes from a line connecting the top of the vertical wall to the top of the hump on the side of the second vertical wall.

12. The vehicle wheel as claimed in claim 10, wherein the additional air chamber member comprises a pair of additional air chamber members that are arranged to face each other across a rotation center of the wheel.

13. A vehicle wheel including an additional air chamber member on an outer circumferential surface of a well functioning as a Helmholtz resonator in a tire air chamber, comprising:
   a first vertical wall surface formed on a vertical wall which stands up on an outer circumferential surface of the well to extend in a circumferential direction of the outer circumferential surface,
   a second vertical wall surface formed on one rising part of the well to extend in a circumferential direction of the outer circumferential surface so as to face the first vertical wall surface in the width direction of the outer circumferential surface, wherein
   a part between the vertical wall and another rising part of the well is used for drop a tire bead thereon while the tire is being attached to the vehicle wheel; wherein
   the additional air chamber member comprising a body fitted into the first vertical wall surface and a second vertical wall, including an additional air chamber and a communication through hole for communication between the additional air chamber with a tire air chamber, and a fastening part, formed on the both sides of the body configured to fasten the body between the first vertical wall surface and the second vertical wall surface, wherein
   in the cross section of the body in the width direction, an upper surface of the body inclines to have an upward slope from a side of the first vertical wall surface to a side of the second vertical wall surface, and
   in the cross section of the body in the width direction of the body, the body upwardly protrudes from a line connecting the top of the vertical wall to the top of the hump on the side of the second vertical wall.

14. The vehicle wheel as claimed in claim 13, wherein a top of the vertical wall is lower than a top of a hump on the side of the second vertical wall from the outer circumferential surface, and wherein the upper surface of the body is formed to extend along and inside in a wheel diametrical direction a line connecting the top of the vertical wall to the top of the hump on the side of the second vertical wall.

15. The vehicle wheel as claimed in claim 13, wherein the additional air chamber member comprises a pair of additional air chamber members that are arranged to face each other across a rotation center of the wheel.

* * * * *